(12) United States Patent
Anzawa

(10) Patent No.: US 11,236,692 B2
(45) Date of Patent: Feb. 1, 2022

(54) MISFIRE DETECTION DEVICE FOR INTERNAL COMBUSTION ENGINE, MISFIRE DETECTION SYSTEM FOR INTERNAL COMBUSTION ENGINE, DATA ANALYSIS DEVICE, CONTROLLER FOR INTERNAL COMBUSTION ENGINE, METHOD FOR DETECTING MISFIRE OF INTERNAL COMBUSTION ENGINE, AND RECEPTION EXECUTION DEVICE

(71) Applicant: TOYOTA JIDOSHA KABUSHIKI KAISHA, Toyota (JP)

(72) Inventor: Takumi Anzawa, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 30 days.

(21) Appl. No.: 16/820,806

(22) Filed: Mar. 17, 2020

(65) Prior Publication Data

US 2020/0309054 A1   Oct. 1, 2020

(30) Foreign Application Priority Data

Mar. 29, 2019   (JP) .............................. JP2019-065884

(51) Int. Cl.
*F02D 41/14*   (2006.01)
*F02B 63/04*   (2006.01)
*F02D 41/00*   (2006.01)

(52) U.S. Cl.
CPC .......... *F02D 41/1498* (2013.01); *F02B 63/04* (2013.01); *F02D 41/009* (2013.01);
(Continued)

(58) Field of Classification Search
CPC ............... F02D 41/009; F02D 41/0097; F02D 41/1405; F02D 41/1498; F02D 2200/101;
(Continued)

(56) References Cited

U.S. PATENT DOCUMENTS 5,093,792 A   3/1992   Taki et al.
5,263,364 A   11/1993   Nakayama et al.
(Continued)

FOREIGN PATENT DOCUMENTS

DE   10 2013 208 853 A1   11/2013
DE   10 2015 221 447 A1   5/2017
(Continued)

OTHER PUBLICATIONS

US 11,136,934 B2, 10/2021, Anzawa (withdrawn)*
(Continued)

*Primary Examiner* — John M Zaleskas
(74) *Attorney, Agent, or Firm* — Oblon, McClelland, Maier & Neustadt, L.L.P.

(57) ABSTRACT

A misfire detection device for an internal combustion engine including a crankshaft mechanically connected to a motor generator includes a storage device and processing circuitry. The storage device stores mapping data. The mapping data is data specifying a mapping that outputs a misfire variable using a rotation waveform variable and a damping variable as an input. The misfire variable is a variable related to a probability that a misfire has occurred. The rotation waveform variable is a variable including information on a difference between values of instantaneous speed corresponding to short angular intervals differing from each other. The damping variable is a variable related to a state of a damping process that controls a torque of the motor generator to reduce vibration of a power transmission system of a vehicle.

8 Claims, 7 Drawing Sheets

(52) U.S. Cl.
CPC .... *F02D 41/0097* (2013.01); *F02D 2200/101* (2013.01); *F02D 2200/1015* (2013.01)

(58) Field of Classification Search
CPC .... F02D 2200/1012; F02D 2200/1015; G01M 15/11
See application file for complete search history.

(56) References Cited

U.S. PATENT DOCUMENTS

| | | | | |
|---|---|---|---|---|
| 5,495,415 | A * | 2/1996 | Ribbens | G01M 15/11 123/436 |
| 5,728,941 | A | 3/1998 | Yamamoto et al. | |
| 5,732,382 | A * | 3/1998 | Puskorius | G01M 15/11 123/436 |
| 5,774,823 | A * | 6/1998 | James | G01M 15/11 123/406.24 |
| 5,951,617 | A | 9/1999 | Shinohara et al. | |
| 6,061,624 | A * | 5/2000 | Kashimura | G01M 15/11 701/110 |
| 6,131,444 | A * | 10/2000 | Wu | F02D 41/1405 73/114.02 |
| 6,199,057 | B1 * | 3/2001 | Tawel | G01M 15/11 706/27 |
| 6,292,738 | B1 * | 9/2001 | Feldkamp | G01M 15/11 701/106 |
| 6,434,541 | B1 | 8/2002 | Tawel et al. | |
| 8,261,603 | B2 | 9/2012 | Kondo et al. | |
| 8,855,888 | B2 | 10/2014 | Suzuki | |
| 9,476,335 | B2 | 10/2016 | Teraya et al. | |
| 11,111,869 | B2 * | 9/2021 | Hashimoto | F02D 41/1498 |
| 2004/0122585 | A1 * | 6/2004 | Aono | G01M 15/11 701/111 |
| 2007/0101806 | A1 * | 5/2007 | Yamaguchi | B60K 6/365 73/114.04 |
| 2007/0137289 | A1 * | 6/2007 | Mathews | G01M 15/11 73/114.04 |
| 2007/0186903 | A1 | 8/2007 | Zhu et al. | |
| 2007/0261484 | A1 * | 11/2007 | Nishigaki | G01M 15/11 73/114.04 |
| 2008/0148835 | A1 * | 6/2008 | Akimoto | F02D 41/1498 73/116.01 |
| 2008/0196485 | A1 * | 8/2008 | Akimoto | F02D 35/027 73/114.02 |
| 2008/0243364 | A1 * | 10/2008 | Sun | G01M 15/11 701/111 |
| 2009/0025467 | A1 * | 1/2009 | Suzuki | G01M 15/042 73/114.15 |
| 2009/0065275 | A1 * | 3/2009 | Akimoto | G01M 15/11 180/65.28 |
| 2009/0118990 | A1 * | 5/2009 | Suzuki | F02D 41/1497 701/111 |
| 2009/0145210 | A1 * | 6/2009 | Suzuki | G01M 15/11 73/114.04 |
| 2009/0151469 | A1 * | 6/2009 | Suzuki | B60K 6/365 73/847 |
| 2009/0158829 | A1 * | 6/2009 | Suzuki | G01M 15/11 73/114.02 |
| 2009/0158830 | A1 * | 6/2009 | Malaczynski | G01M 15/11 73/114.04 |
| 2009/0308145 | A1 * | 12/2009 | Suzuki | B60L 50/61 73/114.04 |
| 2010/0030455 | A1 * | 2/2010 | Akimoto | B60K 6/445 701/111 |
| 2010/0050753 | A1 * | 3/2010 | Suzuki | G01M 15/11 73/114.04 |
| 2010/0071448 | A1 * | 3/2010 | Akimoto | B60K 6/445 73/114.04 |
| 2010/0114460 | A1 * | 5/2010 | Akimoto | G01M 15/11 701/111 |
| 2010/0152991 | A1 * | 6/2010 | Suzuki | G01M 15/11 701/99 |
| 2010/0218598 | A1 * | 9/2010 | Suzuki | F02D 41/1497 73/114.04 |
| 2010/0288035 | A1 * | 11/2010 | Arakawa | G01M 15/11 73/114.03 |
| 2010/0294027 | A1 * | 11/2010 | Kondo | F02D 41/1498 73/114.02 |
| 2013/0312504 | A1 * | 11/2013 | Bowman | F02D 41/1498 73/114.05 |
| 2016/0152231 | A1 * | 6/2016 | Sugimoto | G01M 15/12 701/22 |
| 2017/0204795 | A1 * | 7/2017 | Hagari | F02D 35/024 |
| 2017/0267239 | A1 * | 9/2017 | Nakoji | B60K 28/10 |
| 2017/0292466 | A1 * | 10/2017 | Hagari | F02D 41/2474 |
| 2018/0087459 | A1 * | 3/2018 | Hagari | F02D 35/028 |
| 2018/0275017 | A1 * | 9/2018 | Katayama | F02D 41/28 |
| 2019/0145859 | A1 * | 5/2019 | Chen | F02D 41/1497 701/102 |
| 2019/0178191 | A1 * | 6/2019 | Hagari | F02D 41/22 |
| 2019/0293519 | A1 * | 9/2019 | Ota | B60W 20/50 |
| 2020/0263617 | A1 * | 8/2020 | Hashimoto | F02D 41/22 |
| 2020/0263624 | A1 * | 8/2020 | Muto | F02D 41/1405 |
| 2020/0264074 | A1 * | 8/2020 | Hashimoto | F02D 41/1498 |
| 2020/0309053 | A1 * | 10/2020 | Anzawa | F02D 41/068 |
| 2020/0309054 | A1 | 10/2020 | Anzawa | |
| 2020/0309055 | A1 * | 10/2020 | Anzawa | F02D 41/009 |

FOREIGN PATENT DOCUMENTS

| | | | |
|---|---|---|---|
| JP | 01-301946 | A | 12/1989 |
| JP | 04-091348 | A | 3/1992 |
| JP | 4-259669 | A | 9/1992 |
| JP | 05-195858 | A | 8/1993 |
| JP | 9-42041 | A | 2/1997 |
| JP | 09-166042 | A | 6/1997 |
| JP | 10-110649 | A | 4/1998 |
| JP | 2001-065402 | A | 3/2001 |
| JP | 2001065402 | A * | 3/2001 |
| JP | 2001-507772 | A | 6/2001 |
| JP | 2009-174397 | A | 8/2009 |
| JP | 2010-53730 | A | 3/2010 |
| JP | 2010-264854 | A | 11/2010 |
| JP | 2010264854 | A * | 11/2010 |
| JP | 2017-155712 | A | 9/2017 |
| JP | 2018-135844 | A | 8/2018 |
| JP | 2018-159349 | A | 10/2018 |
| JP | 2018-178810 | A | 11/2018 |

OTHER PUBLICATIONS

Office Action dated Dec. 17, 2020 in co-pending U.S. Appl. No. 16/820,815, 9 pages.
Notice of Allowance dated Mar. 15, 2021 in co-pending U.S. Appl. No. 16/820,815.
Corrected Notice of Allowability dated Apr. 2, 2021 in co-pendina U.S. Appl. No. 16/820,815.
U.S. Corrected Notice of Allowability issued in U.S. Appl. No. 16/820,815 dated Jul. 12, 2021.

* cited by examiner

MISFIRE DETECTION DEVICE FOR INTERNAL COMBUSTION ENGINE, MISFIRE DETECTION SYSTEM FOR INTERNAL COMBUSTION ENGINE, DATA ANALYSIS DEVICE, CONTROLLER FOR INTERNAL COMBUSTION ENGINE, METHOD FOR DETECTING MISFIRE OF INTERNAL COMBUSTION ENGINE, AND RECEPTION EXECUTION DEVICE

BACKGROUND

1. Field

The following description relates to a misfire detection device for an internal combustion engine, a misfire detection system for an internal combustion engine, a data analysis device, a controller for an internal combustion engine controller, a method for detecting a misfire of an internal combustion engine, and a reception execution device.

2. Description of Related Art

Japanese Laid-Open Patent Publication No. 2010-264854 describes an example of a controller that determines whether a misfire is present. The time the crankshaft takes to rotate an angular interval of 30° CA is referred to as 30° CA time. The controller determines a rotation variation amount of the crankshaft by obtaining a difference between respective values of 30° CA times corresponding to multiple angular intervals, and determines whether a misfire is present based on a magnitude comparison between the rotation variation amount and a misfire determination value. The controller is mounted on a hybrid vehicle in which a motor generator is mechanically connected to a crankshaft. The controller changes the misfire determination value in accordance with whether damping control is executed by operating torque of the motor generator to reduce vibration in a power transmission system of the vehicle. This configuration is based on consideration that the absolute value of the rotation variation amount decreases during the damping control.

In the controller described above, the misfire determination value needs to be separately adapted in accordance with the execution state of the damping control. This increases the number of man-hours for adaptation.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Hereinafter, a plurality of aspects of the present disclosure and their operation effects will be described.

Aspect 1. An aspect of the present disclosure provides a misfire detection device for an internal combustion engine including a crankshaft mechanically connected to a motor generator. The misfire detection device includes a storage device and processing circuitry. The storage device stores mapping data. The mapping data is data specifying a mapping that outputs a misfire variable using a rotation waveform variable and a damping variable as an input. The misfire variable is a variable related to a probability that a misfire has occurred. An interval between rotation angles at which compression top dead center is reached in the internal combustion engine is a reaching interval. Multiple angular intervals, each of which is shorter than the reaching interval, are multiple short angular intervals. A rotational speed of the crankshaft in each of the short angular intervals is an instantaneous speed. The rotation waveform variable is a variable including information on a difference between values of the instantaneous speed corresponding to the short angular intervals differing from each other. The damping variable is a variable related to a state of a damping process that controls a torque of the motor generator to reduce vibration of a power transmission system of a vehicle. The processing circuitry is configured to execute an acquisition process that acquires the rotation waveform variable and the damping variable based on a detection value of a sensor configured to detect a rotational behavior of the crankshaft, a determination process that determines whether the misfire is present based on an output of the mapping using the variable acquired by the acquisition process as an input, and a handling process that, when the determination process determines that a misfire has occurred, handles occurrence of the misfire by operating predetermined hardware. The mapping performs a join operation of the rotation waveform variable and the damping variable based on a parameter learned by machine learning to output a value of the misfire variable.

In the configuration described above, the rotation waveform variable is included in the input to the mapping based on consideration that the rotational behavior of the crankshaft varies at different angular intervals depending on whether a misfire is present. The rotational behavior of the crankshaft also varies depending on whether a damping control is executed. Hence, the damping variable is included in the input to the mapping. In the configuration described above, a value of the misfire variable is calculated through a join operation of the rotation waveform variable and the damping variable based on a parameter learned by machine learning. In this case, the parameter may be learned based on whether a misfire is present when the rotation waveform variable and the damping variable have various values. This eliminates the need for separate adaptation of the parameter for each state of the damping variable. Thus, the number of man-hours for adaptation is reduced.

Aspect 2. In the misfire detection device according to aspect 1, the damping process includes a process that superimposes a correction torque on a request torque to the motor generator. The correction torque is torque for reducing the vibration. The acquisition process includes a process that acquires the correction torque as the damping variable.

In the configuration described above, the correction torque is used as a variable indicating the state of the damping process, so that a value of the misfire variable is calculated based on information on the magnitude of torque superimposed by the damping process on the motor generator. This increases the accuracy of the value of the misfire variable as compared to a configuration that calculates a value of the misfire variable based on only information on whether the damping process is executed.

Aspect 3. In the misfire detection device according to aspect 2, the damping process includes a process that changes a magnitude of the correction torque in accordance with an operating point of the internal combustion engine.

In the configuration described above, the magnitude of the correction torque is changed in accordance with the operating point. Thus, for example, when reducing vibration of the crankshaft caused by torque variation, the correction torque is more appropriate for the reduction of vibration than in a configuration in which the correction torque has a fixed value. In addition, in the configuration described above, the correction torque is set to the damping variable, so that a value of the misfire variable is calculated reflecting the magnitude of the correction torque. As a result, the value of the misfire variable is calculated with higher accuracy than in a configuration that calculates a value of the misfire variable without consideration of information on the magnitude of the correction torque.

Aspect 4. In the misfire detection device according to aspect 3, the input to the mapping includes an operating point variable. The operating point variable is a variable specifying an operating point of the internal combustion engine. The acquisition process includes a process that acquires the operating point variable. The determination process includes a process that determines whether the misfire is present based on an output of the mapping that further uses the operating point variable acquired by the acquisition process as the input to the mapping.

In the configuration described above, the operating point variable specifying the operating point of the internal combustion engine is used as the input to the mapping. The operation amount of an operating unit of the internal combustion engine may be determined based on the operating point of the internal combustion engine. Therefore, the operating point variable is a variable including information on the operation amount of each operating unit. In the configuration described above, the operating point variable is used as the input to the mapping, so that a value of the misfire variable is calculated based on information on the operation amount of each operating unit. This increases the accuracy of calculation of the value of the misfire variable PR reflecting changes in the rotational behavior of the crankshaft caused by the operation amount.

In addition, in the configuration described above, the operating point variable is included in the input to the mapping. Even when the damping variable is a binary variable related to whether or not the damping process is executed, information on the magnitude of the correction torque corresponding to the operating point may be obtained by using both the damping variable and the operating point variable. However, while obtaining information on the magnitude of the correction torque corresponding to the operating point based on the damping variable and the operating point variable, if the mapping is requested to calculate the value of the misfire variable with high accuracy, the mapping may have a complicated structure. In the configuration described above, the correction torque is used as the damping variable, so that the value of the misfire variable is calculated with high accuracy while simplifying the structure of the mapping.

Aspect 5. An aspect of the present disclosure provides a misfire detection system for an internal combustion engine. The misfire detection system includes the processing circuitry and the storage device according to any one of aspects 1 to 4. The determination process includes an output value calculation process that calculates an output value of the mapping using the variable acquired by the acquisition process as an input. The processing circuitry includes a first execution device and a second execution device. The first execution device is mounted at least partially on the vehicle and is configured to execute the acquisition process, a vehicle-side transmission process that transmits data acquired by the acquisition process to outside the vehicle, a vehicle-side reception process that receives a signal based on a calculation result of the output value calculation process, and the handling process. The second execution device is disposed outside the vehicle and is configured to execute an external-side reception process that receives the data transmitted by the vehicle-side transmission process, the output value calculation process, and an external-side transmission process that transmits a signal based on the calculation result of the output value calculation process to the vehicle.

In the configuration described above, the output value calculation process is executed outside the vehicle so that the calculation load on the vehicle side is reduced.

Aspect 6. An aspect of the present disclosure provides a data analysis device that includes the second execution device and the storage device according to aspect 5.

Aspect 7. An aspect of the present disclosure provides a controller for an internal combustion engine. The controller includes the first execution device according to aspect 5.

Aspect 8. An aspect of the present disclosure provides a method for detecting a misfire of an internal combustion engine. The method includes causing a computer to execute the acquisition process, the determination process, and the handling process according to any one of aspects 1 to 4.

The method obtains the same advantages as the configuration described in aspect 1.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

First Embodiment

Hereinafter, a first embodiment of a misfire detection device for an internal combustion engine will be described with reference to the drawings.

Figure 1:
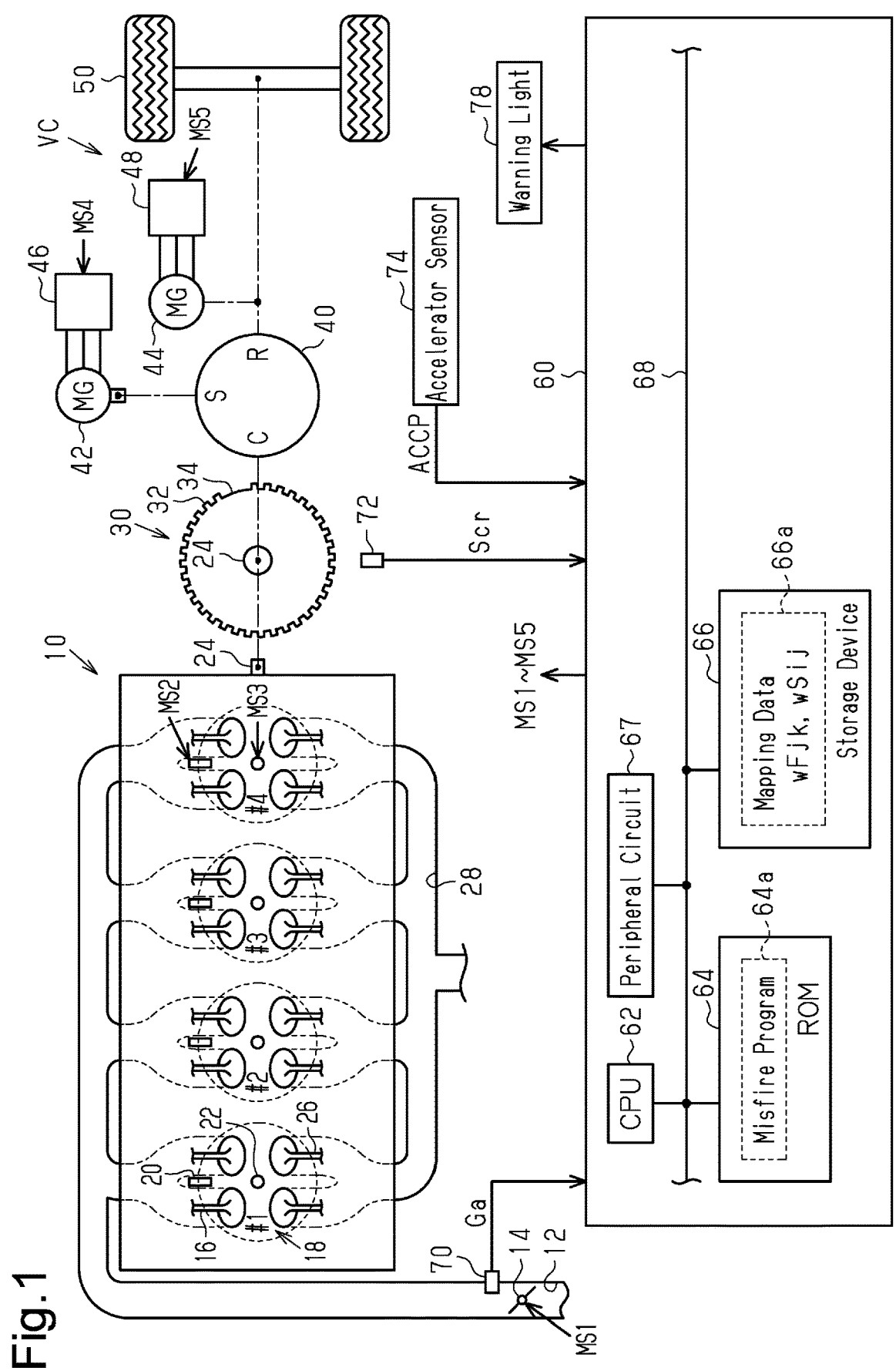
FIG. 1 is a diagram showing the configurations of a controller and a drive system of a vehicle according to a first embodiment.

FIG. 1 shows an internal combustion engine 10 that is mounted on a vehicle VC and includes a throttle valve 14 provided in an intake passage 12. When an intake valve 16 is open, air drawn in from the intake passage 12 flows into a combustion chamber 18 of the corresponding one of cylinders #1 to #4. Fuel is injected into the combustion chamber 18 by a fuel injection valve 20. In the combustion chamber 18, the air-fuel mixture is subjected to combustion by spark discharge caused by an ignition device 22, and the energy generated by the combustion is output as rotation energy of a crankshaft 24. When an exhaust valve 26 is open, the air-fuel mixture subjected to combustion is discharged to an exhaust passage 28 as exhaust air.

The crankshaft 24 is coupled to a crank rotor 30 provided with multiple (here, thirty-four) teeth 32 indicating rotation angles of the crankshaft 24. The crank rotor 30 is basically provided with the teeth 32 at intervals of 10° CA, however there is one missing tooth 34 where the interval between the adjacent teeth 32 is 30° CA. This indicates a reference rotation angle of the crankshaft 24.

The crankshaft 24 is mechanically coupled to a carrier C of a planetary gear mechanism 40 configuring a power split mechanism. The planetary gear mechanism 40 includes a sun gear S mechanically connected to the rotation shaft of a first motor generator 42 and a ring gear R mechanically connected to the rotation shaft of a second motor generator 44 and drive wheels 50. AC voltage is applied to each terminal of the first motor generator 42 by an inverter 46. AC voltage is applied to each terminal of the second motor generator 44 by an inverter 48.

The controller 60 is configured to control the internal combustion engine 10 and operates operating units of the internal combustion engine 10 such as the throttle valve 14, the fuel injection valve 20, and the ignition device 22 to control the control aspects of the internal combustion engine 10 such as torque and an exhaust component ratio. The controller 60 is also configured to control the first motor generator 42 and operates the inverter 46 to control torque and rotational speed of the first motor generator 42, which are the control aspects. The controller 60 is also configured to control the second motor generator 44 and operates the inverter 48 to control torque and rotational speed of the second motor generator 44, which are the control aspects. FIG. 1 shows operation signals MS1 to MS5 of the throttle valve 14, the fuel injection valve 20, the ignition device 22, and the inverters 46 and 48, respectively.

In controlling the control amount, the controller 60 refers to an intake air amount Ga detected by an air flow meter 70, an output signal Scr of a crank angle sensor 72, and an accelerator operation amount ACCP, that is, a depression amount of the accelerator pedal, detected by an accelerator sensor 74.

The controller 60 includes a CPU 62, a ROM 64, a storage device 66 that is an electrically rewritable non-volatile memory, and a peripheral circuit 67, which are configured to communicate with each other through a local network 68. The peripheral circuit 67 includes, for example, a circuit that generates a clock signal regulating an internal operation, a power supply circuit, and a reset circuit.

The controller 60 controls the control aspects with the CPU 62 executing programs stored in the ROM 64.

Figure 2:
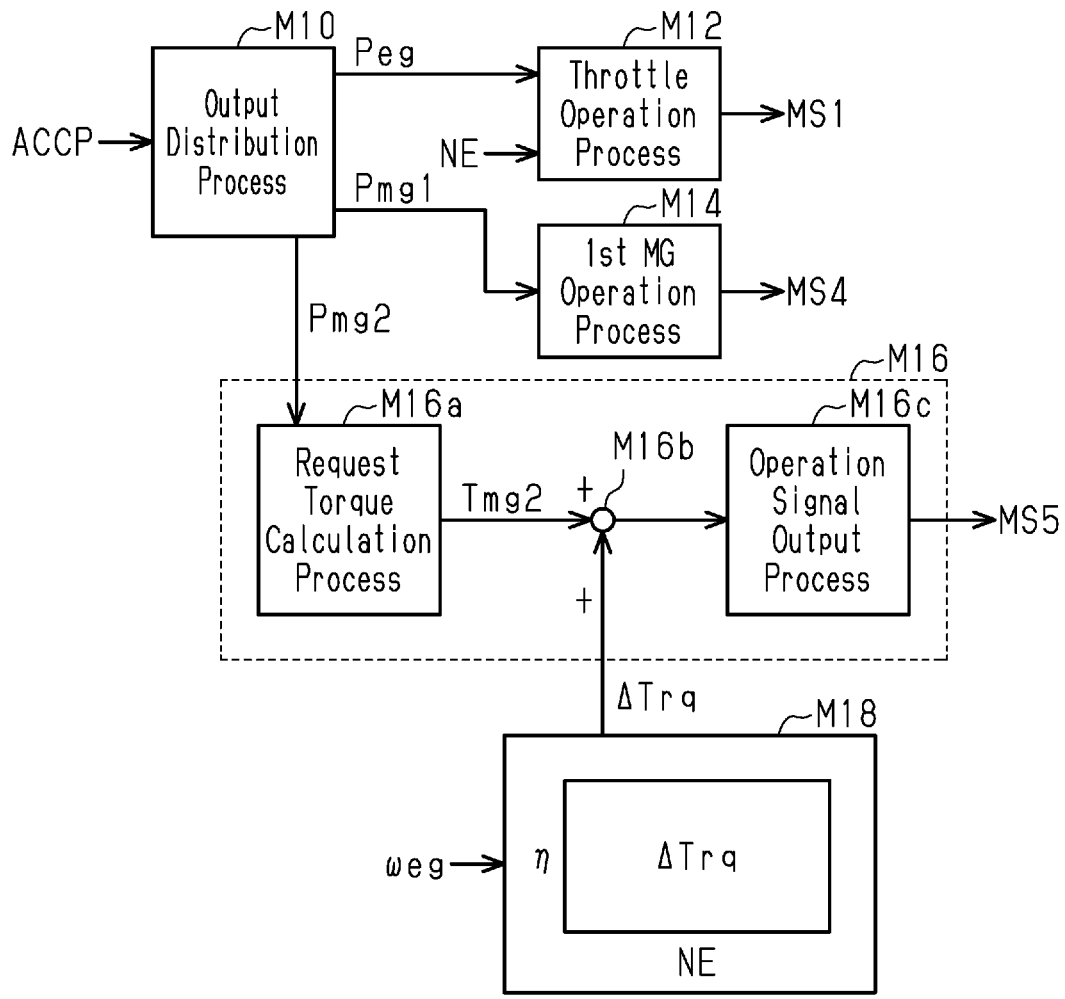
FIG. 2 is a block diagram showing some of the processes executed by the controller according to the first embodiment.

FIG. 2 shows some of the processes implemented by the CPU 62 executing programs stored in the ROM 64.

An output distribution process M10 divides an output requested for propulsion of the vehicle into a request output Peg to the internal combustion engine 10, a request output Pmg1 to the first motor generator 42, and a request output Pmg2 to the second motor generator 44 based on the accelerator operation amount ACCP.

A throttle operation process M12 outputs an operation signal MS1 to the throttle valve 14 in order to operate the opening degree of the throttle valve 14 based on the request torque of the internal combustion engine 10 obtained from the request output Peg and the rotational speed NE. The rotational speed NE is calculated by the CPU 62 based on the output signal Scr. The rotational speed NE may be an average value of the rotational speed of the crankshaft 24 that is rotated at a rotation angle corresponding to one or more rotations of the crankshaft 24. The average value is not limited to a simple average. For example, an exponential moving average process may be used. In this case, the average value is calculated based on time series data of the output signal Scr when the crankshaft 24 is rotated by the rotation angle corresponding to one or more rotations.

A first motor generator (MG) operation process M14 transmits an operation signal MS4 to the inverter 46 to control the output of the first motor generator 42 based on the request output Pmg1.

A second MG operation process M16 transmits an operation signal MS5 to the inverter 48 to control the output of the second motor generator 44 based on the request output Pmg2. More specifically, the second MG operation process M16 includes a request torque calculation process M16a, a correction process M16b, and an operation signal output process M16c.

The request torque calculation process M16a calculates a request torque Tmg2 of the second motor generator 44 based on the request output Pmg2. The correction process M16b adds a correction torque ΔTrq to the request torque Tmg2. The operation signal output process M16c transmits an operation signal MS5 to the inverter 48 so that the torque of the second motor generator 44 equals the torque output by the correction process M16b.

A correction torque calculation process M18 uses an instantaneous speed ωeg of the crankshaft 24 as an input to calculate a correction torque ΔTrq of the second motor generator 44 for reducing vibration in a power transmission system of the vehicle caused by the torque variation of the crankshaft 24. The instantaneous speed ωeg is a rotational speed at an angular interval shorter than one rotation of the crankshaft 24. The rotational speed at an angular interval of 30° CA may be obtained, for example, by dividing 30° CA by a time taken for rotation of 30° CA. The angular interval of 30° CA may also be referred to as a short angular interval. The rotational speed NE described above is an average value of the instantaneous speed ωeg at an angular interval of one or more rotations of the crankshaft 24.

More specifically, the correction torque calculation process M18 includes a process that detects torque variation based on a sign inversion of instantaneous acceleration based on the difference between adjacent data in the time series data of the instantaneous speed ωeg. The correction torque calculation process M18 also includes a process that, when the torque variation is detected, calculates a correction torque ΔTrq having a sign for stopping rotation of the second motor generator 44. When the torque variation is not detected, the correction torque ΔTrq is set to zero. More specifically, the ROM 64 in advance stores map data having the rotational speed NE and the filling efficiency η. Which specify the operating point of the internal combustion engine 10, as input variables and the correction torque ΔTrq as an output variable. When the torque variation is detected, the CPU 62 executes map calculation of the correction torque ΔTrq based on the rotational speed NE and the filling efficiency η.

The map data is set data of discrete values of an input variable and respective values of an output variable corresponding to the values of the input variable. When the value of an input variable matches any one of the values of the input variable in map data, the map calculation may use the corresponding value of the output variable in the map data as a calculation result. When there is no match, the map calculation may use a value obtained by interpolating multiple values of the output variable in the map data as a calculation result.

The controller 60 further determines whether a misfire is present when the internal combustion engine 10 is running.

Figure 3:
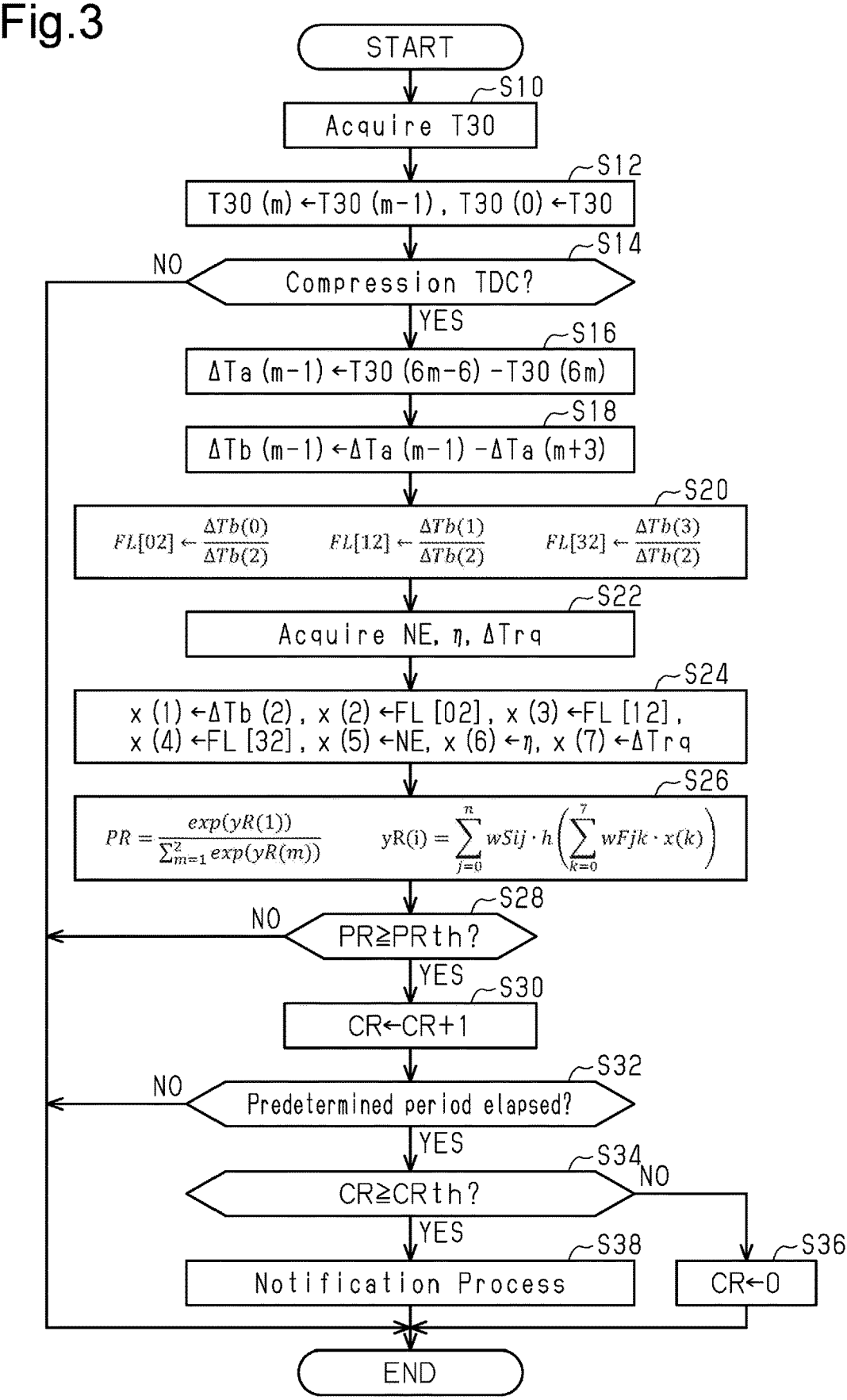
FIG. 3 is a flowchart showing the procedures of a process specified in a misfire program according to the first embodiment.

FIG. 3 shows the procedure of a process related to misfire detection. The process shown in FIG. 3 is implemented by the CPU 62 repeatedly executing a misfire program 64a stored in the ROM 64 in, for example, a predetermined cycle. Hereinafter, the step number of each process is represented by a numeral with "S" in front.

In a series of processes shown in FIG. 3, the CPU 62 acquires the short rotation time T30 (S10). The CPU 62 calculates the short rotation time T30 by measuring time that the crankshaft 24 takes to rotate 30° CA based on the output signal Scr of the crank angle sensor 72. The CPU 62 sets the latest short rotation time T30 acquired in the process of S10 as the short rotation time T30(0), and increases the value of variable "m" of the short rotation time T30(m) for older values (S12). That is, when "m=1, 2, 3, . . . ," the short rotation time T30(m−1) immediately before execution of the process of S12 set to the short rotation time T30(m). Thus, for example, the short rotation time T30 acquired by the process of S10 in the previous execution of the process of FIG. 3 is set to the short rotation time T30(1).

The CPU 62 determines whether or not the short rotation time T30 acquired in the process of S10 is the time taken for rotation of an angular interval from 30° CA in advance of a compression top dead center to the compression top dead center of any of cylinders #1 to #4 (S14). When it is determined that the short rotation time T30 is the time taken for rotation of the angular interval to the compression top dead center (S14: YES), the CPU 62 calculates the value of the rotation waveform variable, which is used as an input for a process that determines whether a misfire is present, to determine whether a misfire has occurred in the cylinder that reached a compression top dead center at an angle advanced by 360° CA.

More specifically, the CPU 62 calculates the difference between the values separated by 180° of the short rotation time T30, which is related to the angular interval from 30° CA in advance of a compression top dead center to the compression top dead center, as an inter-cylinder variable ΔTa (S16). More specifically, the CPU 62 sets "T30(6m−6)−T30(6m)" to the inter-cylinder variable ΔTa(m−1) where "m=1, 2, 3, . . . ."

Figure 4:
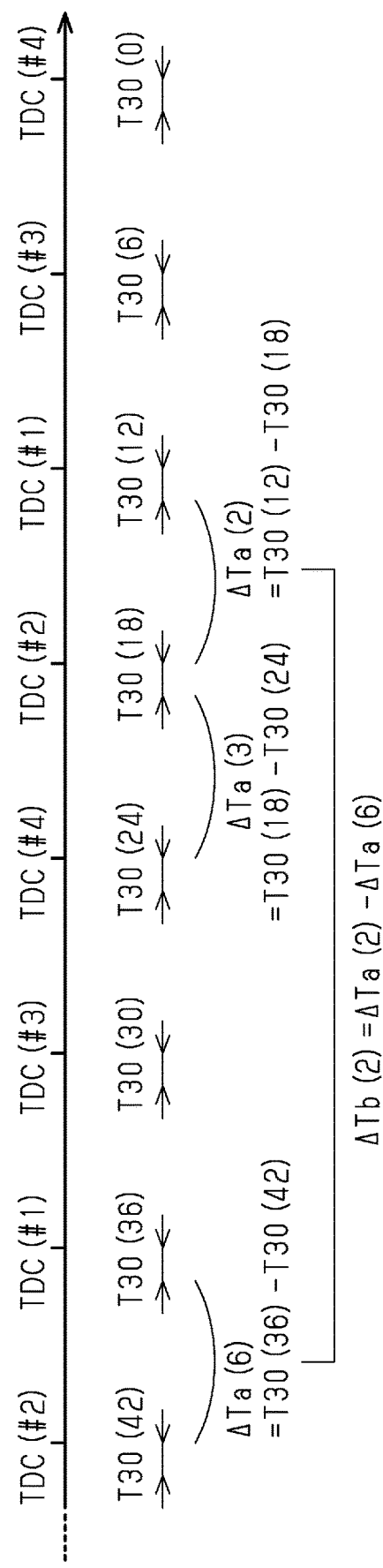
FIG. 4 is a time chart showing an input variable of a mapping according to the first embodiment.

FIG. 4 shows the inter-cylinder variable ΔTa. In the present embodiment, the compression top dead center is reached in the order of the cylinder #1, the cylinder #3, the cylinder #4, and the cylinder #2, and the combustion stroke is performed in this order. FIG. 4 shows an example in which the short rotation time T30(0) of the cylinder #4 at the angular interval from 30° CA in advance of a compression top dead center to the compression top dead center is acquired in the process of S10, so that the cylinder #1 is subject to detection for misfire. In this case, the inter-cylinder variable ΔTa(0) is the difference between the short rotation time T30 corresponding to the compression top dead center of the cylinder #4 and the short rotation time T30 corresponding to the compression top dead center of the cylinder #3, in which the compression top dead center was reached immediately before the cylinder #4. FIG. 4 shows that the inter-cylinder variable ΔTa(2) is the difference between the short rotation time T30(12), which corresponds to the compression top dead center of the cylinder #1 subject to detection for misfire and the short rotation time T30(18), which corresponds to the compression top dead center of the cylinder #2.

Referring again to FIG. 3, the CPU 62 calculates the inter-cylinder variable ΔTb, which is the difference between values separated by 720° CA of the inter-cylinder variables ΔTa(0), ΔTa(1), ΔTa(2), . . . (S18). More specifically, the CPU 62 sets "ΔTa(m−1)−ΔTa(m+3)" to the inter-cylinder variable ΔTb(m−1) where "m=1, 2, 3, . . . ."

FIG. 4 shows the inter-cylinder variable ΔTb. FIG. 4 shows that the inter-cylinder variable ΔTb(2) is "ΔTa(2)−ΔTa(6)."

The CPU 62 calculates a variation pattern variable FL, which indicates a relative magnitude relationship between the inter-cylinder variable ΔTb corresponding to the cylinder subject to detection for misfire and the inter-cylinder variable ΔTb corresponding to the other cylinders (S20). In the present embodiment, the variation pattern variables FL[02], FL[12], AND FL[32] are calculated.

The variation pattern variable FL[02] is defined by "ΔTb(0)/ΔTb(2)." That is, when using the example of FIG. 4, the variation pattern variable FL[02] is a value obtained by dividing the inter-cylinder variable ΔTb(0) corresponding to the cylinder #4 by the inter-cylinder variable ΔTb(2) corresponding to the cylinder #1, which is subject to detection for misfire. In this example, the cylinder #4 reaches the compression top dead center after the cylinder next to the cylinder #1. The variation pattern variable FL[12] is defined by "ΔTb(1)/ΔTb(2)." That is, when using the example of FIG. 4, the variation pattern variable FL[12] is a value obtained by dividing the inter-cylinder variable ΔTb(1) corresponding to the cylinder #3 by the inter-cylinder variable ΔTb(2) corresponding to cylinder #1, which is subject to detection for misfire. The cylinder #3 reaches the compression top dead center immediately after the cylinder #1. The variation pattern variable FL[32] is defined by "ΔTb(3)/ΔTb(2)." That is, when using the example of FIG. 4, the variation pattern variable FL[32] is a value obtained by dividing the inter-cylinder variable ΔTb(3) corresponding to the cylinder #2 by the inter-cylinder variable ΔTb(2) corresponding to the cylinder #1, which is subject to detection for misfire. The cylinder #2 reaches the compression top dead center immediately before the cylinder #1.

The CPU 62 acquires the rotational speed NE, the filling efficiency η, and the correction torque ΔTrq (S22).

The CPU 62 assigns the value of the rotation waveform variable acquired by the processes of S18 and S20 and the value of the variable acquired by the process of S22 to the input variables x(1) to x(7) of a mapping that outputs a misfire variable PR. The misfire variable PR is a variable related to the probability that a misfire has occurred in the cylinder subject to the detection (S24). That is, the CPU 62 assigns the inter-cylinder variable ΔTb(2) to the input variable x(1), assigns the variation pattern variable FL[02] to the input variable x(2), assigns the variation pattern variable FL[12] to the input variable x(3), and assigns the variation pattern variable FL[32] to the input variable x(4). The CPU 62 also assigns the rotational speed NE to the input variable x(5), assigns the filling efficiency η to the input variable x(6), and assigns the correction torque ΔTrq to the input variable x(7).

Then, the CPU 62 inputs the input variables x(1) to x(7) to a mapping defined by mapping data 66a stored in the storage device 66 shown in FIG. 1 to calculate the value of the misfire variable PR, which is the output value of the mapping (S26).

In the present embodiment, the mapping is configured by a neural network having one intermediate layer. The above neural network includes an activation function h(x) used as an input side nonlinear mapping that nonlinearly converts an input side coefficient wFjk (j=0 to n, k=0 to 7) and each output of an input side linear mapping, which is a linear mapping defined by the input side coefficient wFjk. In the present embodiment, ReLU is exemplified as the activation function h(x). ReLU is a function that outputs the non-lesser one of the input and zero. Here, wFj0 is one of the bias parameters, and the input variable x(0) is defined as one.

The above neural network includes a softmax function that inputs an output side coefficient wSij (i=1 to 2, j=0 to n) and original variables yR(1) and yR(2), each of which is an output of an output side linear mapping, that is, a linear mapping defined by the output side coefficient wSij, to output the misfire variable PR. In the present embodiment, the misfire variable PR is obtained by quantifying the magnitude of likelihood that a misfire has actually occurred as a continuous value within a predetermined region that is greater than zero and less than one.

The CPU 62 determines whether or not the value of the misfire variable PR is greater than or equal to the determination value PRth (S28). When it is determined that the value of the misfire variable PR is greater than or equal to the determination value PRth (S28: YES), the CPU 62 increments the counter CR (S30). The CPU 62 determines whether or not a predetermined period has elapsed from the point in time when the process of S28 was executed for the first time or the point in time when the process of S36 (described later) was executed (S32). The predetermined period is longer than the period of one combustion cycle. The predetermined period may be ten or more times one combustion cycle.

When it is determined that the predetermined period has elapsed (S32: YES), the CPU 62 determines whether or not the counter CR is greater than or equal to a threshold value CRth (S34). This process determines whether or not the frequency of occurrence of misfire exceeds the allowable range. When it is determined that the counter CR is less than the threshold value CRth (S34: NO), the CPU 62 initializes the counter CR (S36). When it is determined that the counter CR is greater than or equal to the threshold value CRth (S34: YES), the CPU 62 executes a notification process that operates a warning light 78 shown in FIG. 1 to prompt the user to response to the abnormality (S38).

When the process of S36 or S38 is completed or when a negative determination is made in the process of S14, S28, or S32, the CPU 62 temporarily terminates the series of processes shown in FIG. 3.

The mapping data 66a is generated, for example, in the following manner. A dynamometer is connected to the crankshaft 24 and the internal combustion engine 10 is driven on a test bench. A point in time is randomly selected from points in time at which a requested fuel is injected to the cylinders #1 to #4, and the fuel injection is stopped at the selected point in time. For a cylinder in which fuel injection is stopped, data in which the value of a misfire variable PR is one is used as teacher data. For a cylinder in which fuel injection is not stopped, data in which the value of the misfire variable PR is zero is included in teacher data. Then, each rotation waveform variable and the value of the variable acquired by the process of S22 are used to calculate the value of misfire variable PR through processes similar to the processes of S24 and S26. The values of the input side coefficient wFjk and the output side coefficient wSij are learned so as to reduce the difference between the value of the misfire variable PR calculated as described above and the teacher data. More specifically, for example, the values of the input side coefficient wFjk and the output side coefficient wSij may be learned so as to minimize the tolerance entropy. Torque applied to the crankshaft 24 by the dynamometer may be used to simulate execution of the damping process. Thus, by using machine learning, the mapping data 66a may be learned using teacher data produced by relatively freely running the internal combustion engine 10 so as to have various operating points. This reduces the number of man-hours for adaptation as compared to a configuration in which map data is adapted to each of the various operating points based on detection of behavior of the crankshaft 24 in accordance with whether a misfire is present.

The operations and effects of the present embodiment will be described.

The CPU 62 determines whether a misfire is present by calculating the value of the misfire variable PR based on the rotation waveform variable. In addition, when torque variation of the crankshaft 24 is detected, the CPU 62 executes the damping process by correcting the torque of the second motor generator 44 with the correction torque ΔTrq. When a misfire occurs, which generates torque variations, the damping process may be executed so that the rotational variation of the crankshaft 24 is reduced.

Figure 5:
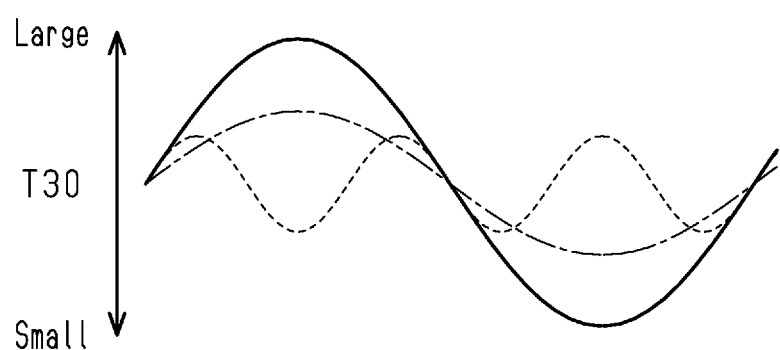
FIG. 5 is a time chart showing a rotational behavior waveform of a crankshaft according to the first embodiment.

In FIG. 5, the broken line shows the short rotation time T30 in a normal state. The solid line shows the short rotation time T30 when the damping process is not executed when a misfire has occurred. The dashed line shows the short rotation time T30 when the damping process is executed when a misfire has occurred. As shown in FIG. 5, when the damping process is executed when a misfire has occurred, variation of the short rotation time T30 is less than when the damping process is not executed. This reduces the difference between the variation of the short rotation time T30 when the damping process is executed when a misfire has occurred and variation of the short rotation time T30 when a misfire does not occur. Therefore, if the correction torque ΔTrq is not included in the input variable, the accuracy of distinguishing the variation of the short rotation time T30 when the damping process is executed when a misfire has occurred from the variation of the short rotation time T30 when a misfire does not occur may be decreased. In this regard, in the present embodiment, the correction torque ΔTrq is included in the input variable x to calculate the value of the misfire variable PR. Thus, even when the damping process is executed, the misfire variable PR expresses whether a misfire is present with high accuracy.

Furthermore, the value of the misfire variable PR is calculated through the join operation of the rotation waveform variable and the correction torque ΔTrq using the input side coefficient wFjk, which is a parameter learned by machine learning. This allows, for example, the value of the input side coefficient wFjk to be learned regardless of the execution state of the damping process such as the magnitude of the correction torque ΔTrq. Therefore, adaptation values do not need to be adapted for each execution state of the damping process.

The present embodiment further has the following operations and effects.

(1) The rotational speed NE and the filling efficiency η, which are the operating point variables specifying the operating point of the internal combustion engine 10, are used as inputs to the mapping. The operation amounts of the operating units of the internal combustion engine 10 such as the fuel injection valve 20 and the ignition device 22 may be determined based on the operating point of the internal combustion engine 10. Therefore, the operating point variable is a variable including information on the operation amount of each operating unit. By using the operating point variables as the inputs to the mapping, the value of the misfire variable PR may be calculated based on information on the operation amount of each operating unit. As a result, the value of the misfire variable PR is calculated with higher accuracy while reflecting changes in the rotational behavior of the crankshaft 24 caused by the operation amount.

In addition, by using the operating point variables as the input variables, the value of the misfire variable PR is calculated through a join operation of the rotation waveform variable and the operating point variable using the input side coefficient wFjk, which is a parameter learned by machine learning. This eliminates the need for adaption of an adaptation value for each operating point variable. However, for example, when comparing the value of the inter-cylinder variable ΔTb and the determination value, the determination value for each operating point variable needs to be adapted, which increase the number of man-hours for the adaptation.

(2) The correction torque ΔTrq is included in the input variable. This configuration obtains more detailed information on the effect of rotational behavior of the crankshaft 24 than a configuration in which the input variable is a binary variable indicating whether or not the damping process is executed. The value of the misfire variable PR is calculated with higher accuracy.

In the present embodiment, since the correction torque ΔTrq varies in accordance with the operating point variable, the operating point variable and the binary variable, which indicates whether or not the damping process is executed, could be included in the input variable x so that the value of the misfire variable PR is calculated based on the magnitude of the correction torque ΔTrq. However, to obtain such a configuration, the structure of the mapping may become complicated, for example, by increasing the number of intermediate layers of the neural network. This may result in increases in the calculation load. In the present embodiment, the correction torque ΔTrq is included in the input variable x, so that the value of the misfire variable PR is calculated with high accuracy while simplifying the structure of the mapping as compared to a configuration that includes the operating point variable and the binary variable indicating whether or not the damping process is executed.

(3) The rotation waveform variable, which is the input variable x, is produced by selectively using a value of the short rotation time T30 near compression top dead center. Variation in the value of the short rotation time T30 depending on whether a misfire is present is most significant near compression top dead center. Therefore, the value of the short rotation time T30 near compression top dead center is selectively used, so that information necessary for determining whether a misfire is present is maximally obtained while limiting increases in the dimensions of the input variable x.

(4) The inter-cylinder variable ΔTb(2) is included in the rotation waveform variable. The inter-cylinder variable ΔTb(2) is obtained by quantifying in advance the difference in short rotation time T30 near compression top dead center between the cylinder subject to detection for misfire and a cylinder that is adjacent to the subject cylinder in one dimension. Thus, information used to determine whether a misfire is present is efficiently obtained with a variable having a small number of dimensions.

(5) In addition to the inter-cylinder variable ΔTb(2), the fluctuation pattern variable FL is included in the rotation waveform variable. Since, for example, vibration from the road surface is superimposed on the crankshaft 24, when the rotation waveform variable is only the inter-cylinder variable ΔTb(2), an erroneous determination may be made. In the present embodiment, the value of the misfire variable PR is calculated using the fluctuation pattern variable FL in addition to the inter-cylinder variable ΔTb(2), so that the value of the misfire variable PR indicates the likelihood (probability) that a misfire has occurred more accurately than in a configuration in which the value of the misfire variable PR is calculated only from the inter-cylinder variable ΔTb(2).

Furthermore, in the present embodiment, the value of the misfire variable PR is calculated through the join operation of the inter-cylinder variable ΔTb(2) and the variation pattern variable FL using the input side coefficient wFjk, which is a parameter learned by machine learning. Therefore, whether a misfire is present is determined based on a more detailed relationship of misfire with the inter-cylinder variable ΔTb(2) and the variation pattern variable FL, as compared to a configuration that determines whether a misfire is present based on a comparison of the inter-cylinder variable ΔTb(2) with the determination value and a comparison of the variation pattern variable FL with the determination value.

Second Embodiment

A second embodiment will be described below with reference to the drawings, focusing on the differences from the first embodiment.

In the present embodiment, the process that calculates the misfire variable PR is executed outside the vehicle.

Figure 6:
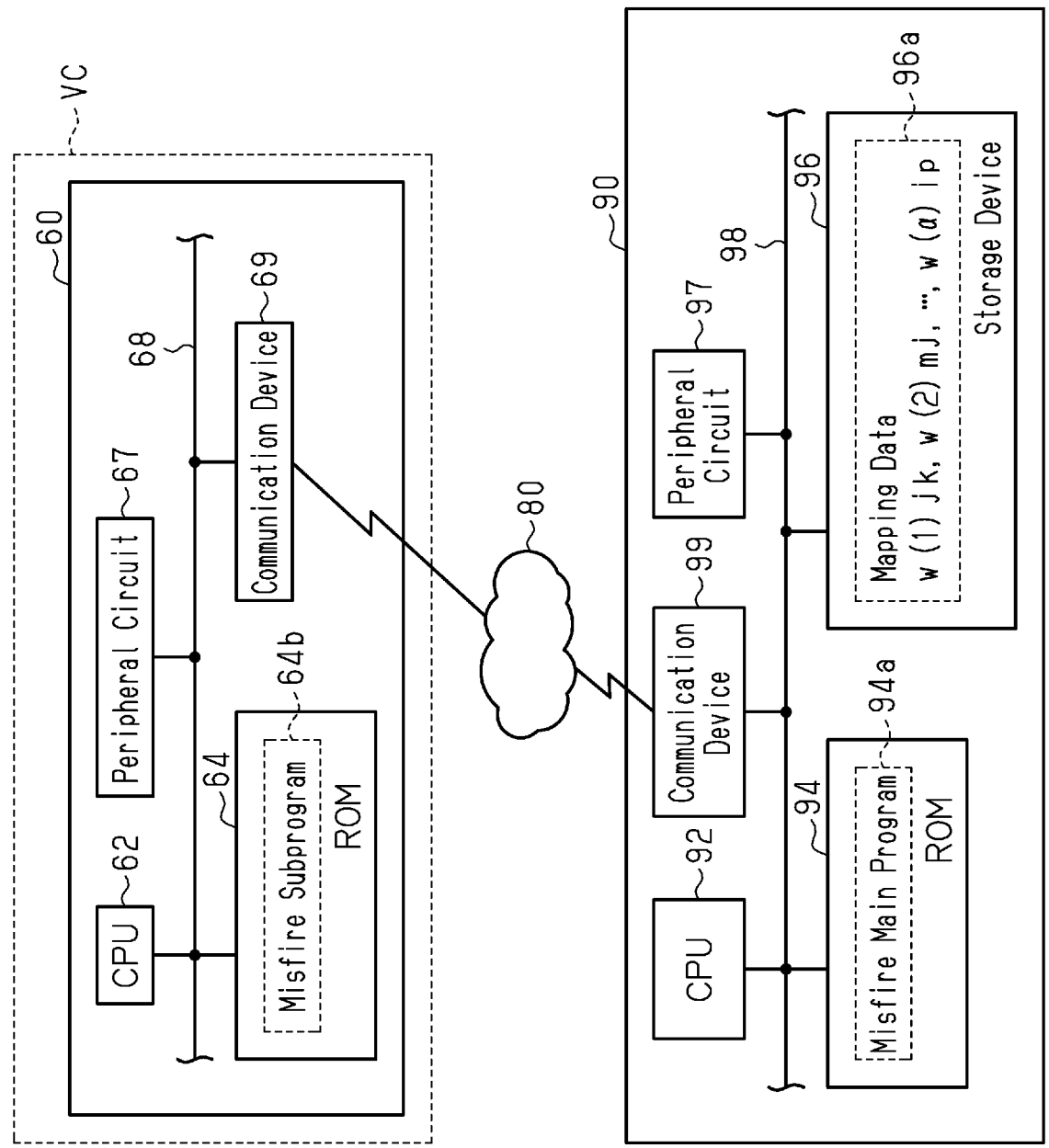
FIG. 6 is a view showing the configuration of a misfire detection system according to a second embodiment.

FIG. 6 shows a misfire detection system according to the present embodiment. For the sake of convenience, in FIG. 6, members corresponding to the members shown in FIG. 1 are denoted with the same reference characters.

FIG. 6 shows a controller 60 that is disposed in the vehicle VC and includes a communication device 69. The communication device 69 is configured to communicate with a center 90 via the network 80 outside the vehicle VC.

The center 90 analyzes data transmitted from multiple vehicles VC. The center 90 includes a CPU 92, a ROM 94, a storage device 96, a peripheral circuit 97, and a communication device 99, which are configured to communicate with each other through a local network 98. The storage device 96 stores mapping data 96a.

Figure 7:
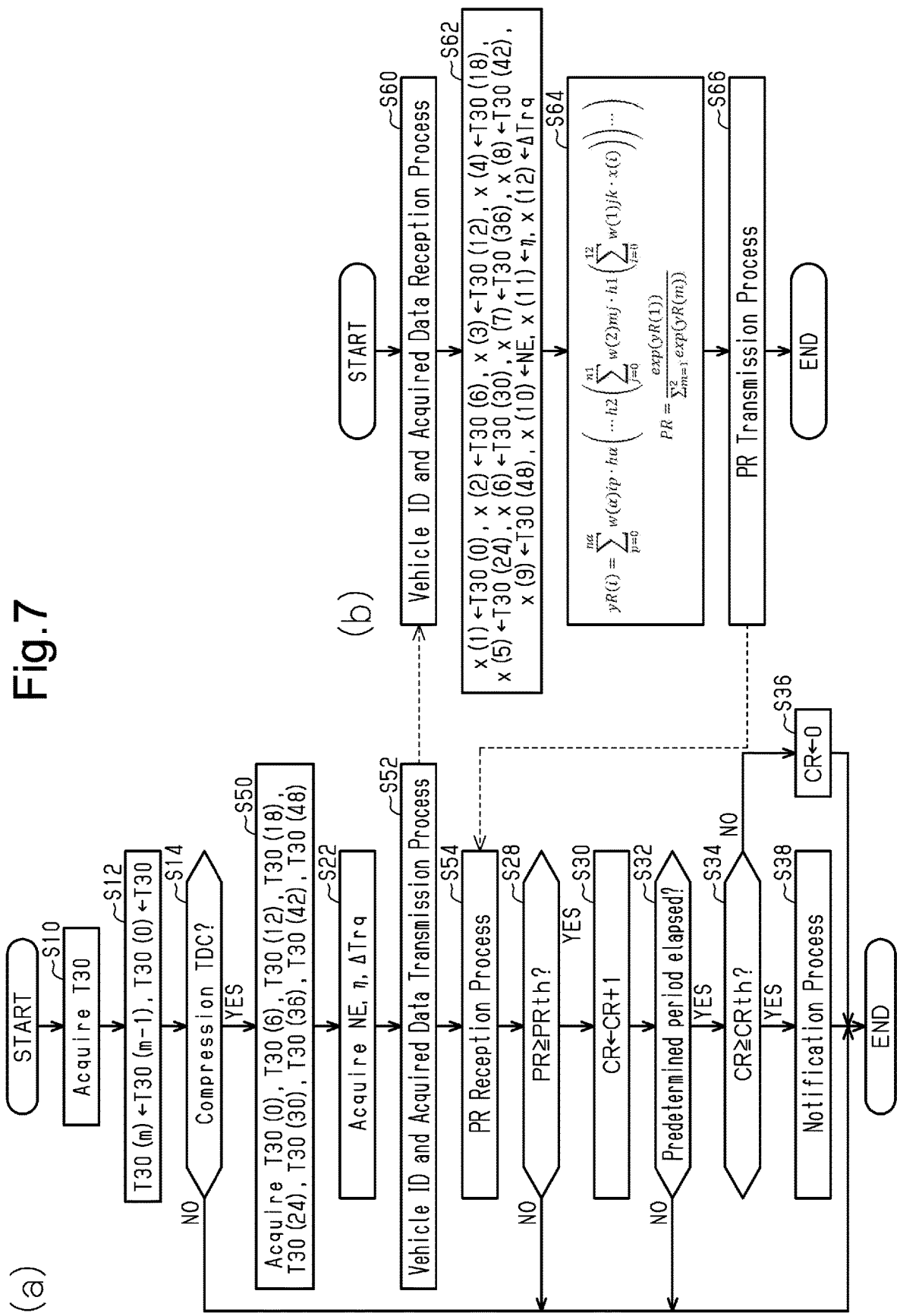
FIG. 7 is a flowchart showing the procedures of a process executed by the misfire detection system according to the second embodiment.

FIG. 7 shows the procedures of a process related to detection for misfire according to the present embodiment. The process shown in (a) in FIG. 7 is implemented by the CPU 62 executing a misfire subprogram 64b stored in the ROM 64 shown in FIG. 6. The process shown in (b) in FIG. 7 is implemented by the CPU 92 executing a misfire main program 94a stored in the ROM 94. For the sake of convenience, in FIG. 7, processes corresponding to the processes shown in FIG. 3 are denoted with the same step number. Hereinafter, the process shown in FIG. 7 will be described along the time series of the misfire detection process.

In the vehicle VC, when an affirmative determination is made in the process of S14 shown in (a) in FIG. 7, the CPU 62 acquires the short rotation times T30(0), T30(6), T30(12), T30(18), T30(24), T30(30), T30(36), T30(42), and T30(48) (S50). These short rotation times T30 configure a rotation waveform variable that is a variable including information related to differences in short rotation time T30 between angular intervals differing from each other. In particular, short rotation time T30 is a time taken to make a rotation of an angular interval from 30° CA in advance of a compression top dead center to the compression top dead center, and is a value corresponding to nine reaching timings of compression top dead center. Therefore, set data of short rotation times T30 is a variable indicating information on the differences in short rotation time T30 between compression top dead centers differing from each other. Nine short rotation times T30 described above are the entirety of short rotation times T30 that are used to calculate the inter-cylinder variable ΔTb(2) and the fluctuation pattern variables FL[02], FL[12], and FL[32].

After executing the process of S22, the CPU 62 operates the communication device 69 to transmit the data acquired in the processes of S50 and S22 to the center 90 together with the identification information (vehicle ID) of the vehicle VC (S52).

As shown in (b) in FIG. 7, the CPU 92 of the center 90 receives the transmitted data (S60). The CPU 92 assigns the values of the variable acquired by the process of S60 to the input variables x(1) to x(12) (S62). More specifically, the CPU 62 assigns the short rotation time T30(0) to the input variable x(1), assigns the short rotation time T30(6) to the input variable x(2), assigns the short rotation time T30(12) to the input variable x(3), and assigns the short rotation time T30(18) to the input variable x(4). In addition, the CPU 92 assigns the short rotation time T30(24) to the input variable x(5), assigns the short rotation time T30(30) to the input variable x(6), and assigns the short rotation time T30(36) to the input variable x(7). Moreover, the CPU 92 assigns the short rotation time T30(42) to the input variable x(8) and assigns the short rotation time T30(48) to the input variable x(9). In addition, the CPU 92 assigns the rotational speed NE to the input variable x(10), assigns the filling efficiency η to the input variable x(11), and assigns the correction torque ΔTrq to the input variable x(12).

Then, the CPU 92 inputs the input variables x(1) to x(12) to a mapping specified by the mapping data 96a stored in the storage device 96 shown in FIG. 6 to calculate the value of the misfire variable PR, which is the output value of the mapping (S64).

In the present embodiment, the mapping is configured by a neural network in which the number of intermediate layers is "α," the activation functions h1 to hα of each intermediate layer are ReLU, and the activation function of the output layer is a softmax function. For example, the value of each node in the first intermediate layer is generated by inputting the input variables x(1) to x(12) to a linear mapping defined by the coefficient w(1)ji(j=0 to n1, i=0 to 12) to obtain an output and inputting the output to the activation function h1. More specifically, when m=1, 2, . . . , α, the value of each node in the m-th intermediate layer is generated by inputting an output of a linear mapping specified by the coefficient w(m) to the activation function hm. In FIG. 7, n1, n2, . . . , nα are the number of nodes in the first, second, . . . , α-th intermediate layers. Here, w(1)j0 is one of the bias parameters, and the input variable x(0) is defined as one.

The CPU 92 operates the communication device 99 to transmit a signal indicating the value of the misfire variable PR to the vehicle VC that has transmitted data received by the CPU 92 in the process of S60 (S66), and temporarily terminates the series of processes shown in (b) in FIG. 7. As shown in (a) in FIG. 7, the CPU 62 receives the value of the misfire variable PR (S54), and executes the processes of S28 to S38.

In the present embodiment, the process of S64 is executed in the center 90, so that the calculation load of the CPU 62 is reduced.

Correspondence Relationship

Correspondence relationship between the items in the embodiments described above and the items described in "Summary" is as follows. Hereinafter, the correspondence relationship is shown for each number of the aspect described in "Summary."

[1-3] The misfire detection device corresponds to the controller 60. The execution device, that is, the processing circuitry, corresponds to the CPU 62 and the ROM 64. The storage device corresponds to the storage device 66. The rotation waveform variable corresponds to the inter-cylinder variable ΔTb(2) and the variation pattern variables FL[02], FL[12], and FL[32]. The damping variable corresponds to the correction torque ΔTrq. The damping process corresponds to the correction torque calculation process M18 and the second MG operation process M16 when the correction torque ΔTrq is not zero. The acquisition process corresponds to the processes of S18 to S22. The determination process corresponds to the processes of S24 to S36. The handling process corresponds to the process of S38.

[4] The operating point variable corresponds to the rotational speed NE and the filling efficiency η.

[5] The first execution device corresponds to the CPU 62 and the ROM 64. The second execution device corresponds to the CPU 92 and the ROM 94. The acquisition process corresponds to the processes of S50 and S22. The vehicle-side transmission process corresponds to the process of S52. The vehicle-side reception process corresponds to the process of S54. The external-side reception process corresponds to the process of S60. The output value calculation process corresponds to the processes of S62 and S64. The external-side transmission process corresponds to the process of S66.

[6] The data analysis device corresponds to the center 90.

[7] The controller for an internal combustion engine corresponds to the controller 60 shown in FIG. 6.

[8] The computer corresponds to the CPU 62 and ROM 64 or the CPU 62, CPU 92, ROM 64 and ROM 94.

Other Embodiments

The embodiments can be modified and implemented as below. The embodiments and the following modified examples may be implemented by being combined with each other within a scope not technically conflicting each other.

Damping Process

In the embodiments described above, the correction torque ΔTrq is variably set in accordance with the operating point of the internal combustion engine 10. However, there is no limitation to such a configuration. For example, a value determined in advance may be set.

In the embodiments described above, whether the damping process is executed is determined based on the instantaneous angular speed of the crankshaft 24. However, there is no limitation to such a configuration. For example, whether the damping process is executed may be determined based on the instantaneous rotational angular speed of the rotation shaft of the second motor generator 44. The damping process may be, for example, a process that superimposes correction torque on the request torque of the first motor generator 42 in accordance with the shift position when the internal combustion engine 10 is idling. This reduces vibration during idling.

The damping process may be, for example, a process that reduces torsion of a shaft connected to the drive wheels 50 or vibration caused by rotational vibration of the drive wheels 50. This is implemented by, for example, multiplying the rotational speed of the second motor generator 44 by a predetermined coefficient to obtain a vehicle speed calculation value, calculating an estimated vehicle speed based on the vehicle speed calculation value and torque of the second motor generator 44, and correcting the torque of the second motor generator 44 so that the difference between the estimated vehicle speed and the vehicle speed calculation value is reduced.

Damping Variable

The damping variable is not limited to the correction torque $\Delta Trq$. For example, as described in "Damping Process," when the correction torque $\Delta Trq$ is fixed to a predetermined value, for example, a binary variable indicating whether or not the damping process is executed may be used as the damping variable. Even when the correction torque $\Delta Trq$ is variably set, the damping variable may be set as a binary variable indicating whether or not the damping process is executed. Even in such a case, for example, if the correction torque $\Delta Trq$ is variably set in accordance with the operating point of the internal combustion engine 10 and a variable specifying the operating point is used as the input to the mapping, the number of intermediate layers of the neural network may be increased to calculate the value of the misfire variable PR high accuracy.

Inter-Cylinder Variable

The inter-cylinder variable $\Delta Tb$ is not limited to the difference between values of differences between the short rotation times T30 corresponding to compression top dead centers of two cylinders in which the compression top dead centers are consecutively reached when the values are obtained at separation of 720° CA. For example, the inter-cylinder variable may be a difference between values of differences between the short rotation times T30 corresponding to compression top dead centers of two cylinders in which the compression top dead centers are reached at separation of 360° CA when the values are obtained at separation of 720° CA. In this case, the inter-cylinder variable $\Delta Tb(2)$ is "T30(12)−T30(24)−{T30(36)−T30(48)}."

There is no limitation to the difference between values of differences between the short rotation times T30 corresponding to compression top dead centers of two cylinders where the values are obtained at separation of 720° CA. The inter-cylinder variable may be a difference between short rotation times T30 corresponding to compression top dead centers of the cylinder subject to detection for misfire and the other cylinders.

Furthermore, for example, the inter-cylinder variable may be a ratio of short rotation time T30 corresponding to compression top dead center of a cylinder to short rotation time T30 corresponding to compression top dead center of another cylinder.

The short rotation time for defining the inter-cylinder variable $\Delta Tb$ is not limited to the time taken for rotation of 30° CA, and for example, may be a time taken for rotation of 45° CA. In this case, the short rotation time may be a time taken for rotation of an angular interval less than or equal to the reaching interval of compression top dead center. The reaching interval of compression top dead center refers to an interval between the rotation angles of the crankshaft 24 at which compression top dead centers are reached.

Furthermore, in the above description, instead of the short rotation time, the instantaneous rotational speed may be obtained by dividing a predetermined angular interval by a time taken for rotation of the predetermined angular.

Variation Pattern Variable

The definition of the variation pattern variable is not limited to that exemplified in the embodiments. For example, the definition of the variation pattern variable may be changed by changing the inter-cylinder variable $\Delta Tb$ to, for example, that exemplified in "Inter-Cylinder Variable."

Moreover, it is not essential to define the fluctuation pattern variable as a ratio of the inter-cylinder variable $\Delta Tb$ corresponding to a reaching timing of compression top dead center to the inter-cylinder variable $\Delta Tb$ corresponding to another reaching timing of compression top dead center. Instead of the ratio, a difference may be used. Even in this case, for example, by including the operating point variable of the internal combustion engine 10 in the input, the value of the misfire variable PR is calculated reflecting changes in the value of the fluctuation pattern variable corresponding to the operating point.

Rotation Waveform Variable

In the process of S26, the rotation waveform variable is configured by the inter-cylinder variable $\Delta Tb(2)$ and the variation pattern variables FL[02], FL[12], and FL[32]. However, there is no limitation to such a configuration. For example, the variation pattern variable configuring the rotation waveform variable may be any one or two of the variation pattern variables FL[02], FL[12], and FL[32]. Furthermore, for example, four or more variation pattern variables such as variation pattern variables FL[02], FL[12], FL[32], and FL[42] may be included.

In the process of S64, the rotation waveform variable is configured by short rotation time T30 corresponding to each of the nine different reaching timings of compression top dead center. However, there is no limitation to such a configuration. For example, the compression top dead center of the cylinder subject to detection for misfire is considered as the center, and the rotation waveform variable may be configured by short rotation time T30 in each section obtained by dividing an interval that is two or more times the angular interval in which compression top dead center is reached by an interval of 30° CA. In the above description, it is not essential to consider the compression top dead center of the cylinder subject to detection for misfire as the center. In addition, the short rotation time is not limited to the time taken for rotation of the interval of 30° CA. In addition, instead of the short rotation time, the instantaneous rotational speed may be obtained by dividing a predetermined angular interval by the time taken for rotation of the predetermined angular interval.

Operating Point Variable

The operating point variable is not limited to the rotational speed NE and the filling efficiency η. For example, the intake air amount Ga and the rotational speed NE may be used. Furthermore, for example, as described in "Internal Combustion Engine," when a compression ignition type internal combustion engine is used, the injection amount and the rotational speed NE may be the operating point variables. It is not essential to use the operating point variable as an input of the mapping. For example, when an internal combustion engine is mounted on a series hybrid vehicle described below in "Vehicle," the values of the misfire variables PR, PC may be calculated with high accuracy without including the operating point variable in the input variable in a case in which the internal combustion engine is driven only in a specific operating point.

External-Side Transmission Process

In the process of S66, the value of the misfire variable PR is transmitted. However, there is no limitation to such a configuration. For example, the values of original variables yR(1) and yR(2), which are inputs of the softmax function serving as the output activation function, may be transmitted. For example, the processes of S28 to S36 may be executed in the center 90, and the determination result of whether there is an abnormality may be transmitted.

Handling Process

In the above embodiments, the warning light 78 is operated to provide a notification that a misfire has occurred through visual information. However, there is no limitation to such a configuration. For example, a speaker may be operated to provide a notification that a misfire has occurred through auditory information. For example, the controller 60 shown in FIG. 1 may include the communication device 69, and the communication device 69 may be operated to transmit a signal indicating that a misfire has occurred to a portable terminal of the user. This may be implemented by installing an application program that executes the notification process in the portable terminal of the user.

The handling process is not limited to the notification process. The handling process may be, for example, an operation process that operates an operation unit for controlling combustion of the air-fuel mixture in the combustion chamber 18 of the internal combustion engine 10 in accordance with information indicating that a misfire has occurred. More specifically, for example, the operation unit may be the ignition device 22 and advance the ignition timing of the cylinder in which misfire has occurred. For example, the operation unit may be the fuel injection valve 20 and increase the amount of fuel injected into the cylinder in which a misfire has occurred.

Input to Mapping

The input to the neural network and the input to the regression equation described below in "Machine Learning Algorithm" are not limited to those in which each dimension is formed by a single physical quantity and the fluctuation pattern variable FL. In the above embodiments, different types of physical quantities and the fluctuation pattern variable FL used as the input to the mapping are directly input to the neural network or the regression equation. Instead, for example, one or more of the different types of physical quantities and the fluctuation pattern variable FL may be analyzed for main components, and some of the main components may be directly input to the neural network or the regression equation. However, when main components are input to the neural network or the regression equation, the main components do not necessarily have to be only a portion of the input to the neural network or the regression equation. The entirety of the input may be the main components. When main components are input to the mapping, the mapping data 66a and 96a include data specifying a mapping that determines the main components.

Mapping Data

The mapping data specifying the mapping used for the calculation executed in the vehicle may be the data defining the mapping shown in the process of S64.

For example, according to the description of (a) and (b) in FIG. 7, the number of intermediate layers in the neural network is expressed as being more than two layers. However, there is no limitation to such a configuration.

In the above embodiments, the activation functions h, h1, h2, . . . hα are ReLU, and the output activation function is a softmax function. However, there is no limitation to such a configuration. For example, the activation functions h, h1, h2, . . . hα may be hyperbolic tangents. For example, the activation functions h, h1, h2, . . . hα may be logistic sigmoid functions.

For example, the output activation function may be a logistic sigmoid function. In this case, for example, the number of nodes in the output layer may be one, the output variable may be used as the misfire variable PR. In that case, when the value of the output variable is greater than or equal to a predetermined value, it may be determined that an abnormality is present.

Machine Learning Algorithm

The algorithm of machine learning is not limited to using a neural network. For example, a regression equation may be used. This corresponds to a neural network that does not include an intermediate layer. For example, a support vector machine may be used. In this case, the magnitude of the value of an output has no meaning. Whether the value is positive or not expresses whether a misfire has occurred. In other words, this differs from a configuration in which a misfire variable has three or more values and the magnitude of the values represents the magnitude of the probability of misfire.

Learning Step

In the embodiments described above, learning is performed in a situation where a misfire occurs randomly. However, there is no limitation to such a configuration. For example, learning may be performed in a situation where a misfire occurs continuously in a particular cylinder. In this case, the inter-cylinder variable ΔTb, which is used for the inter-cylinder variable and the variation pattern variable used as the input to the mapping, may be the difference in short rotation time T30 corresponding to compression top dead center between the cylinder subject to detection for misfire and the other cylinders as described in "Inter-Cylinder Variable."

It is not limited to learning performed based on rotational behavior of the crankshaft 24 when the dynamometer of the crankshaft 24 is connected and the internal combustion engine 10 is driven. For example, learning may be performed based on rotational behavior of the crankshaft 24 when the internal combustion engine 10 is installed in a vehicle and the vehicle travels. In this case, the effect of rotational behavior of the crankshaft 24 caused by the state of the road surface on which the vehicle travels is reflected in the learning.

Data Analysis Device

For example, the processes of S24 and S26 may be executed by the center 90 instead of the processes of S62 and S64.

The process of (b) in FIG. 7 may be executed by, for example, a portable terminal carried by the user. This is implemented by installing an application program for executing the process of (b) in FIG. 7 in the portable terminal. At this time, the transmitting process and the receiving process of the vehicle ID may be omitted, for example, by setting the distance at which data transmission in the process of S68 is effective to approximately the length of the vehicle.

Execution Device

The execution device is not limited to a device including the CPU 62 (92) and the ROM 64 (94) and executing the software processes. The execution device may include, for example, a dedicated hardware circuit (e.g., ASIC, etc.) configured to process at least some of the software processes executed in the embodiments described. In other words, the execution device may have any of the following configurations (a) to (c). Configuration (a) includes a processing device that executes all of the above processes in accordance with programs, and a program storage device such as a ROM that stores the programs. Configuration (b) includes a processing device and a program storage device that execute some of the above processes in accordance with programs, and a dedicated hardware circuit that executes the remaining processes. Configuration (c) includes a dedicated hardware circuit that executes all of the above processes. Here, the software execution device including the processing device and the program storage device or the dedicated hardware circuit may be provided in plurals. That is, the above processes may be executed by processing circuitry that includes at least one of one or more software execution devices or one or more dedicated hardware circuits. The program storage device, that is, a computer readable medium, includes various available media that can be accessed from a general purpose or a dedicated computer.

Storage Device

In the embodiments described above, the storage device that stores the mapping data 66*a*, 96*a* is separate from the storage device (ROM 64, 94) that stores the misfire program 64*a* and the misfire main program 94*a*. However, there is no limitation to such a configuration.

Computer

The computer is not limited to a computer that includes an execution device such as the CPU 62 and the ROM 64 mounted on the vehicle and an execution device such as the CPU 92 and the ROM 94 provided in the center 90. For example, the computer may be configured by an execution device mounted on the vehicle, an execution device provided in the center 90, and an execution device such as CPU and ROM in a portable terminal of the user. This is implemented, for example, when the process of S66 in FIG. 7 is a transmission process to a portable terminal of the user, and the portable terminal executes the processes of S54 and S28 to S36. More specifically, an onboard execution device configured by the CPU 62 and the ROM 64 may be configured not to execute the vehicle-side receiving process and the handling process. A reception execution device included in the portable terminal may be configured to execute at least the vehicle-side receiving process.

Internal Combustion Engine

In the embodiments descried above, the in-cylinder injection valve that injects fuel into the combustion chamber 18 is exemplified as the fuel injection valve. However, there is no limitation to such a configuration. The fuel injection valve may be, for example, a port injection valve that injects fuel into the intake passage 12. Furthermore, for example, both a port injection valve and an in-cylinder injection valve may be provided.

The internal combustion engine is not limited to a spark ignition type internal combustion engine and may be a compression ignition type internal combustion engine using, for example, diesel as fuel.

Vehicle

The vehicle is not limited to a series-parallel hybrid vehicle and may be, for example, a parallel hybrid vehicle.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A misfire detection device for an internal combustion engine including a crankshaft mechanically connected to a motor generator, the misfire detection device comprising:
a storage device; and
processing circuitry, wherein
the storage device stores mapping data, the mapping data being data specifying a mapping that outputs a misfire variable using a rotation waveform variable and a damping variable as an input, wherein the misfire variable is a variable related to a probability that a misfire has occurred,
an interval between rotation angles at which compression top dead center is reached in the internal combustion engine is a reaching interval, multiple angular intervals, each of which is shorter than the reaching interval, are multiple short angular intervals, a rotational speed of the crankshaft in each of the short angular intervals is an instantaneous speed, the rotation waveform variable is a variable including information on a difference between values of the instantaneous speed corresponding to the short angular intervals differing from each other, the damping variable is a variable related to a state of a damping process that controls a torque of the motor generator to reduce vibration of a power transmission system of a vehicle, the processing circuitry is configured to execute
    an acquisition process that acquires the rotation waveform variable and the damping variable based on a detection value of a sensor configured to detect a rotational behavior of the crankshaft,
    a determination process that determines whether the misfire is present based on an output of the mapping using the rotation waveform variable and the damping variable acquired by the acquisition process as the input, and
    a handling process that, when the determination process determines that the misfire has occurred, handles occurrence of the misfire by operating predetermined hardware, and a value of the misfire variable in the mapping is calculated by a join operation of the rotation waveform variable and the damping variable based on a parameter learned by machine learning.

2. The misfire detection device according to claim 1, wherein
the damping process includes a process that superimposes a correction torque on a request torque to the motor generator, the correction torque being torque for reducing the vibration, and
the acquisition process includes a process that acquires the correction torque as the damping variable.

3. The misfire detection device according to claim 2, wherein the damping process includes a process that changes a magnitude of the correction torque in accordance with an operating point of the internal combustion engine.

4. The misfire detection device according to claim 3, wherein
the input to the mapping includes an operating point variable, the operating point variable being a variable specifying the operating point of the internal combustion engine,
the acquisition process includes a process that acquires the operating point variable, and
the determination process includes a process that determines whether the misfire is present based on the output of the mapping that further uses the operating point variable acquired by the acquisition process as the input to the mapping.

5. The misfire detection device according to claim 1, wherein
the rotation waveform variable, which is composed of an inter-cylinder variable and a variation pattern variable, further includes a time taken for rotation of each of multiple partial sections or values of rotational speed corresponding to the partial sections,
the partial sections are obtained by dividing an interval that is two or more times the reaching interval, and each of the partial sections is an interval shorter than the reaching interval, the inter-cylinder variable is a variable obtained by quantifying a difference between the instantaneous speed corresponding to the compression top dead center of a target cylinder, which is a cylinder subject to detection for misfire, and the instantaneous speed corresponding to the compression top dead center of a cylinder differing from the target cylinder, and the target cylinder and the cylinder differing from the target cylinder are a first set of cylinders, and two cylinders differing from the first set of cylinders are a second set of cylinders, the variation pattern variable is a variable obtained by quantifying a relationship between a difference between the values of the instantaneous speed in the first set of cylinders and a difference between the values of the instantaneous speed in the second set of cylinders.

6. A misfire detection system for an internal combustion engine including a crankshaft mechanically connected to a motor generator, the misfire detection system comprising:
a storage device;
first processing circuitry mounted at least partially on a vehicle; and
second processing circuitry disposed outside the vehicle, wherein
the storage device stores mapping data, the mapping data being data specifying a mapping that outputs a misfire variable using a rotation waveform variable and a damping variable as an input, wherein the misfire variable is a variable related to a probability that a misfire has occurred,
an interval between rotation angles at which compression top dead center is reached in the internal combustion engine is a reaching interval,
multiple angular intervals, each of which is shorter than the reaching interval are multiple short angular intervals,
a rotational speed of the crankshaft in each of the short angular intervals is an instantaneous speed,
the rotation waveform variable is a variable including information on a difference between values of the instantaneous speed corresponding to the short angular intervals differing from each other,
the damping variable is a variable related to a state of a damping process that controls a torque of the motor generator to reduce vibration of a power transmission system of a vehicle,
the first processing circuitry is configured to execute
    an acquisition process that acquires the rotation waveform variable and the damping variable based on a detection value of a sensor configured to detect a rotational behavior of the crankshaft,
    a vehicle-side transmission process that transmits data acquired by the acquisition process to outside the vehicle,
    a vehicle-side reception process that receives a signal that the misfire has occurred based on a calculation result of an output value calculation process, and
    a handling process that, when receiving the signal that the misfire has occurred, handles occurrence of the misfire by operating predetermined hardware,
the second processing circuitry is configured to execute
    an external-side reception process that receives the data transmitted by the vehicle-side transmission process,
    the output value calculation process, in which an output value of the mapping is calculated using the rotation waveform variable and the damping variable acquired by the acquisition process as the input, and an external-side transmission process that transmits the signal indicating that the misfire has occurred based on the calculation result of the output value calculation process to the vehicle, and a value of the misfire variable in the mapping is calculated by a join operation of the rotation waveform variable and the damping variable based on a parameter learned by machine learning.

7. The misfire detection system according to claim 6, wherein the first processing circuitry includes an onboard execution device mounted on a vehicle and a reception execution device differing from the onboard execution device, the onboard execution device is configured to execute the acquisition process and the vehicle-side transmission process, and the reception execution device is included in a portable terminal and is configured to execute at least the vehicle-side reception process.

8. A method for detecting a misfire of an internal combustion engine including a crankshaft mechanically connected to a motor generator, wherein an interval between rotation angles at which compression top dead center is reached in the internal combustion engine is a reaching interval, multiple angular intervals, each of which is shorter than the reaching interval, are multiple short angular intervals, a rotational speed of the crankshaft in each of the short angular intervals is an instantaneous speed, the method comprising:

storing, on a storage device, mapping data specifying a mapping that outputs a misfire variable using a rotation waveform variable and a damping variable as an input, wherein the misfire variable is a variable related to a probability that a misfire has occurred, the rotation waveform variable being a variable including information on a difference between values of the instantaneous speed corresponding to the short angular intervals differing from each other, and the damping variable being a variable related to a state of a damping process that controls a torque of the motor generator to reduce vibration of a power transmission system of a vehicle;

calculating a value of the misfire variable by a join operation of the rotation waveform variable and the damping variable based on a parameter learned by machine learning;

acquiring the rotation waveform variable and the damping variable based on a detection value of a sensor configured to detect a rotational behavior of the crankshaft;

determining whether the misfire is present based on an output of the mapping using the acquired rotation waveform variable and the acquired damping variable as the input; and when it is determined that the misfire has occurred, handling occurrence of the misfire by operating predetermined hardware.

* * * * *